United States Patent [19]
Oshita et al.

[11] Patent Number: 4,842,088
[45] Date of Patent: Jun. 27, 1989

[54] ELECTRIC POWER STEERING SYSTEM

[75] Inventors: Saiichiro Oshita; Toyohiko Mouri; Tsutomu Takahashi, all of Ohta, Japan

[73] Assignee: Fuji Jukogyo Kabushiki Kaisha, Tokyo, Japan

[21] Appl. No.: 198,396

[22] Filed: May 24, 1988

[30] Foreign Application Priority Data

May 25, 1987 [JP] Japan ................. 62-127426

[51] Int. Cl.$^4$ .............................. B62D 5/04
[52] U.S. Cl. ..................... 180/79.1; 180/142
[58] Field of Search ............ 180/79.1, 142, 132, 180/141; 74/388 PS

[56] References Cited
U.S. PATENT DOCUMENTS 4,664,211 8/1987 Oshita et al. .................. 180/142
4,754,828 7/1988 Morishita et al. .............. 180/79.1

FOREIGN PATENT DOCUMENTS 45-41246 12/1970 Japan .
61-98675 5/1986 Japan .

Primary Examiner—John A. Pekar
Attorney, Agent, or Firm—Martin A. Farber

[57] ABSTRACT

A system having a motor operatively connected to a steering system for reducing the steering effort. The system is provided with a torsion torque sensor provided for detecting torsion torque generating in the steering system in steering operation. In response to the output signal of the torsion torque sensor, an assist signal and an auxiliary assist signal are produced. A detector is provided for detecting whether a variation value of the torsion torque is in an increasing direction or in a decreasing direction and for producing a direction signal dependent on the detected direction. When a direction signal representing the variation value of the torsion torque in the decreasing direction is generated, the auxiliary assist signal is reduced in value, thereby reducing a total assist signal of the assist signal and the auxiliary assist signal.

13 Claims, 4 Drawing Sheets

ELECTRIC POWER STEERING SYSTEM

BACKGROUND OF THE INVENTION

The present invention relates to an electric power steering system for a motor vehicle, and more particularly to a system for controlling a motor in accordance with the turning of a steering wheel.

The electric power steering system has a torsion torque sensor for measuring torsion torque in a steering shaft. The system is adapted to produce an assist signal to control the rotational direction and torque of a motor in dependency on a torsion torque signal from the sensor (Japanese Patent Application Publication No. 45-41246). The response of the steering system and the returnability of the steering wheel may deteriorate because of the inertia of the motor, the friction of a reduction gear train provided in the system, and other factors.

A control system has been proposed which may prevent the above-described disadvantages (U.S. Pat. No. 4,664,211). The system is provided for producing an auxiliary assist signal dependent on the differential of the torsion torque signal from the torsion torque sensor, a return torque signal depending on an output signal of a steering angle sensor, for returning the steering wheel to a neutral position, and an assist signal depending on the torsion torque signal which is corrected in accordance with vehicle speed. These signal are added for controlling the motor.

In such a system, when the steering wheel at an angular position is rotated in the torsion torque decreasing direction for example the steering wheel is rotated (to the neutral position) by the driver's hand, an assist torque including a return direction torque in the torsion torque decreasing direction is generated, thereby reducing the steering effort. However, if the auxiliary assist signal is set to a value suitable for the operation in the torsion torque increasing direction (FIG. 3), the assist torque including return direction torque in the torsion torque decreasing direction becomes extremely large for returning the steering wheel. As a result, the steering wheel is returned by the driver at a very small force at higher speed than the driver estimates.

Such a high speed return of the steering wheel diminishes steerability of the vehicle and provides an unpleasant feeling to the driver.

SUMMARY OF THE INVENTION

The object of the present invention is to provide a system which may eliminate the above-described disadvantages in the prior art.

According to the present invention, there is provided an electric power steering system having a motor operatively connected to a steering system for reducing steering effort, a torsion torque sensor provided for detecting torsion torque generating in the steering system in steering operation, first means responsive to the output signal of the torsion torque sensor for producing an assist signal, second means for producing an auxiliary assist signal dependent on an differential of the output signal of the torsion torque sensor, third means responsive to a total assist signal of the assist signal and the auxiliary assist signal for producing a signal for driving the motor.

The system comprises detector means for detecting whether a variation value of the torsion torque is in an increasing direction or in a decreasing direction and for producing a direction signal dependent on the detected direction, and corrector means responsive to the direction signal representing the variation value of the torsion torque in the decreasing direction, for reducing the auxiliary assist signal in value thereby reducing the total assist signal.

The other objects and features of this invention will become understood from the following description with reference to the accompanying drawings.

DETAILED DESCRIPTION OF THE PREFERRED EMBODIMENT

Figure 1:
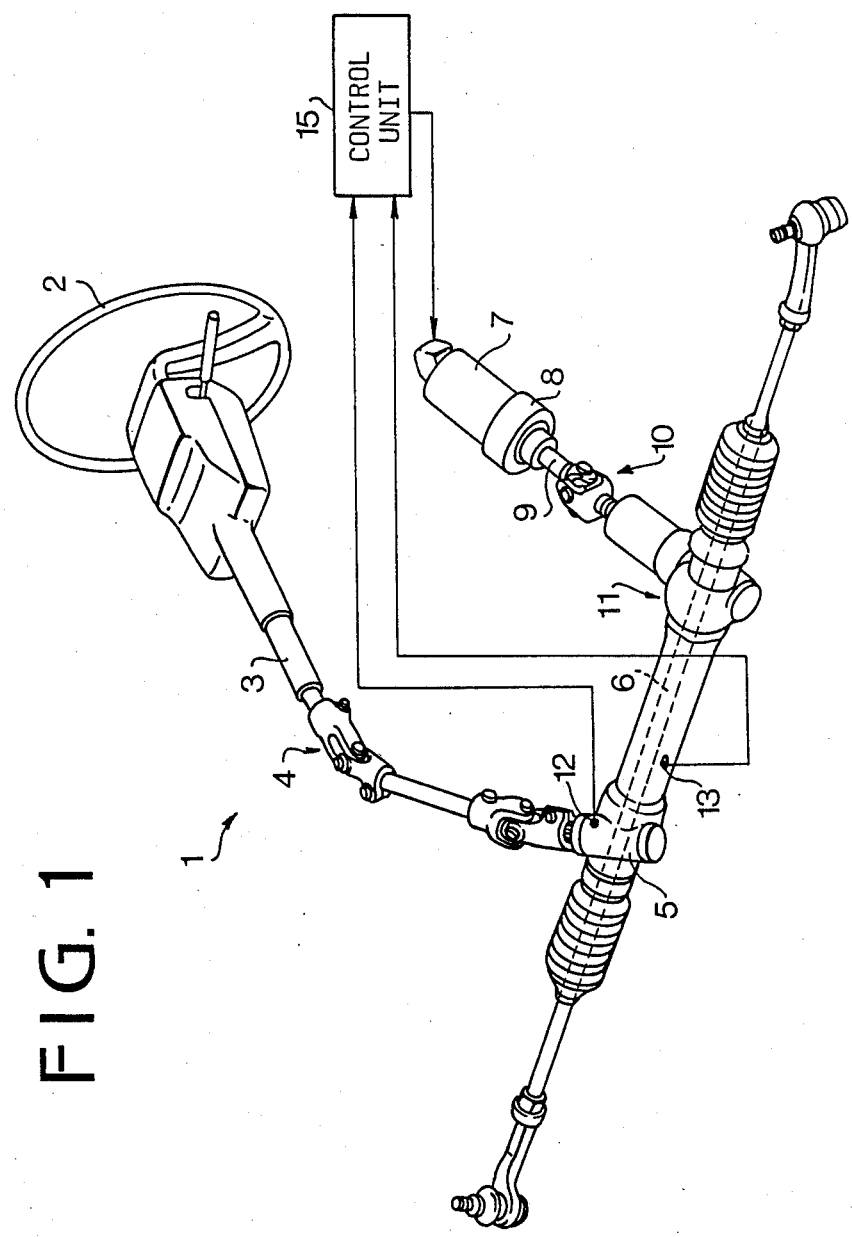
FIG. 1 is a perspective view showing a power steering system to which the present invention is applied.

Referring to FIG. 1, a steering system 1 is a rack-and-pinion type and comprises a steering wheel 2, steering shaft 3, joint 4, gear box 5, and rack 6. Another rack-and-pinion device 11 is provided for an electric power steering. A pinion of the device 11 is engaged with the rack 6. The pinion is operatively connected with an output shaft 9 of a reduction gear device 8 attached to a motor 7. A torsion torque sensor 12 is provided on the gear box 5 for measuring the torsion torque of the steering shaft, and a steering angle sensor 13 is provided adjacent to the rack 6 so as to measure the axial movement of the rack 6 corresponding to the steering angle. Outputs of the sensors 12 and 13 are applied to a control unit 15 of the present invention.

Figure 2A:
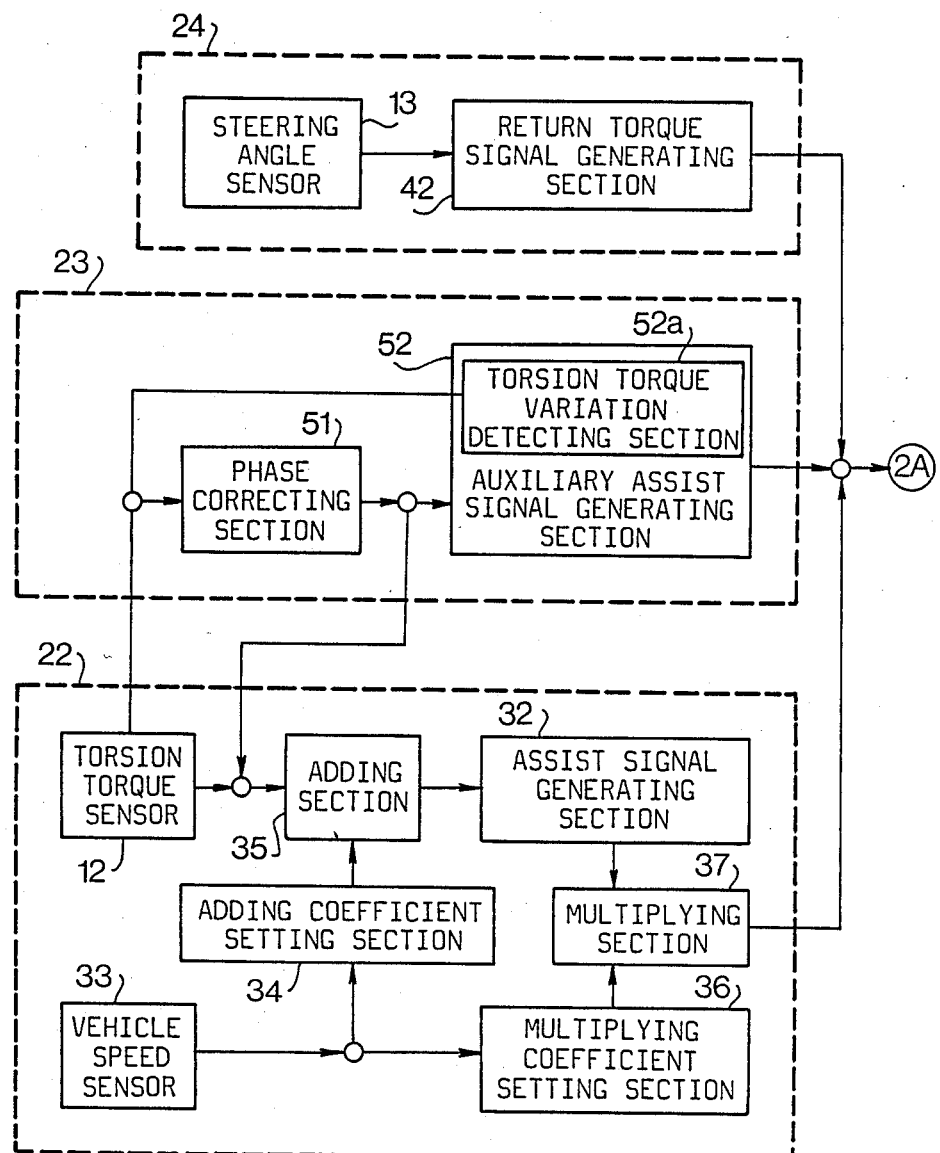
FIG. 2a and 2b show a block diagram of a system according to the present invention.
Figure 2B:
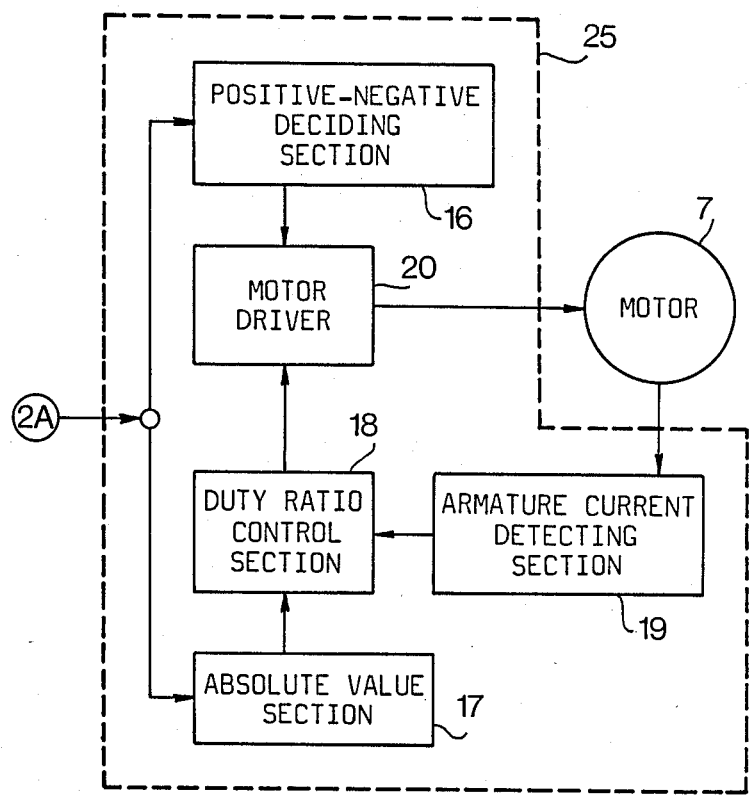
Figure 3:
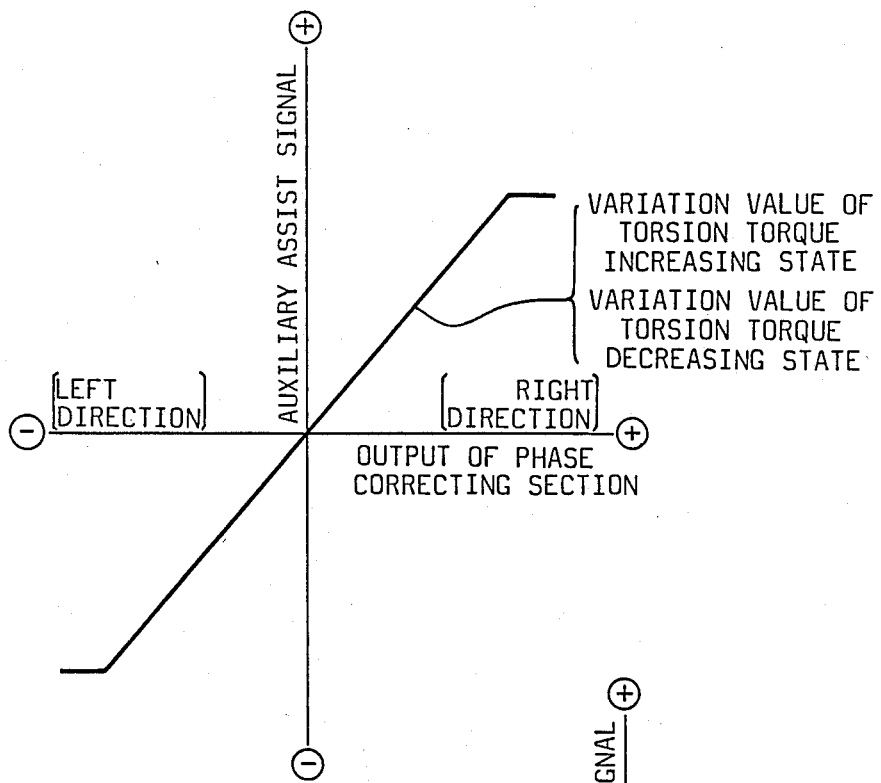
FIG. 3 is a graph showing a characteristic of an auxiliary assist signal in the prior art.

FIGS. 2a and 2b show the control unit 15 which comprises an assist command section 22, phase correction command section 23, return command section 24, and drive control section 25.

The assist command section 22 comprises the torsion torque sensor 12 and a vehicle speed sensor 33. The torsion torque sensor 12 produces an output signal representing the torsion torque and the direction of the torsion at the pinion. The output signal of the vehicle speed sensor 33 is applied to an adding coefficient signal setting section 34 and a multiplying coefficient setting section 36. The adding coefficient signal from the section 34 decreases as the vehicle speed increases. Outputs of the torsion torque sensor 12 and adding coefficient setting section 34 are added at an adding section 35, the output of which is applied to an assist signal generating section 32. The assist signal is generated from the section 32, when the torsion torque rises above a predetermined value and has a polarity dependent on the torsion torque direction of the steering shaft. On the other hand, the multiplying coefficient signal from the secion 36 decreases with an increase of the vehicle speed. The assist signal is multiplied by the multiplying coefficient at a multiplying section 37, so that the assist signal is corrected.

The phase correction command section 23 comprises a phase correcting section 51 applied with the output of torsion torque sensor 12 for producing an output which is proportional to the differential of the output of the sensor 12. Namely, the output of the section 51 represents the speed (rate) of the variation of the torque. The output of the phase correcting section 51 is applied to an auxiliary assist signal generating section 52. The output signal of the section 51 is also added to the output of the torsion torque sensor 12 and fed to the adding section 35, thereby correcting the phase of the assist signal to meet the operation of the motor 7.

The auxiliary assist signal generating section 52 has a torsion torque variation detecting section 52a for determining whether an absolute value of the output signal from the torsion torque sensor 12 is increasing or decreasing. When the absolute value is increasing for example (the steering wheel is rotated in the steering angle increasing direction), the section 52 produces an auxiliary assist signal A dependent on the output signal of the section 51 as shown by a solid line in FIG. 4.

Figure 4:
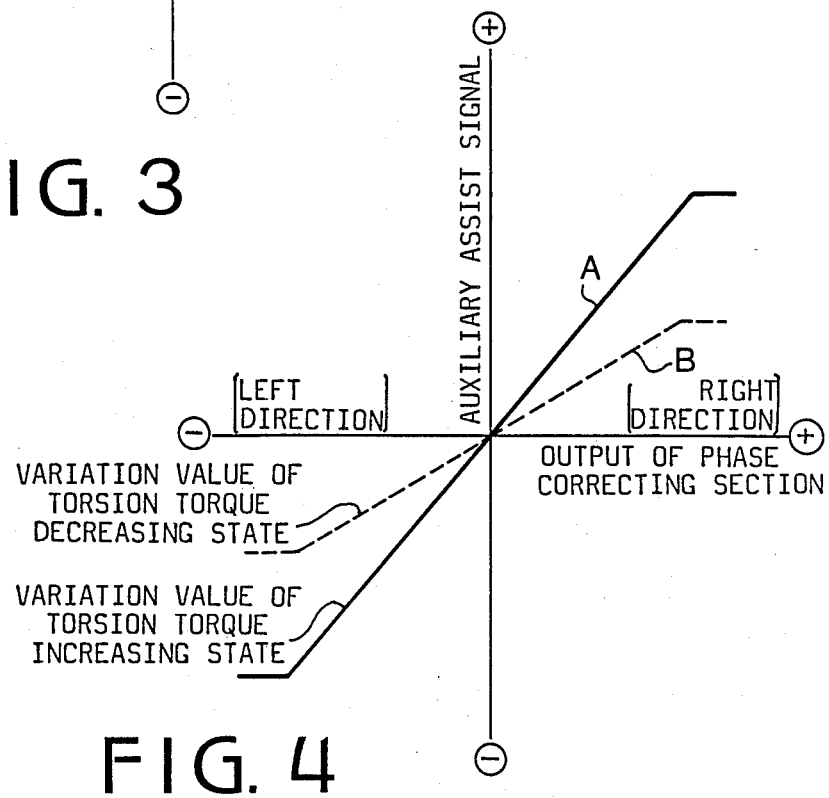
FIG. 4 is a graph showing a characteristic of an auxiliary assist signal in the system of the present invention.

When the absolute value is decreasing for example (the steering wheel is rotated in the steering angle decreasing direction so as to be returned to the neutral position), the section 52 produces an auxiliary assist signal B having a smaller inclination angle than the signal A as shown in FIG. 4. The auxiliary assist signal B is produced in a corrector section of the section 52 by multiplying the signal A by a number smaller than one and larger than zero.

The return command section 24 includes the steering angle sensor 13, the output signal of which is applied to a return torque signal generating section 42. The section 42 generates a return torque signal dependent on the steering angle.

The assist signal, auxiliary assist signal and return torque signal are added and the summation is applied to a positive-negative deciding section 16 and an absolute value section 17 of the drive control section 25. The output of the positive-negative deciding section 16 is applied to the motor 7 through a motor driver 20. The output signal of the absolute value section 17 is applied to a duty ratio control section 18 which produces a pulse train. The pulse train is applied to the driver 20 so that the output torque of the motor 7 is controlled by the duty ratio of the pulse train. The output torque of the motor is fed back to the duty ratio control section 18 by an armature current detecting section 19.

In operation, when a torsion torque is generated by a steering operation, an assist signal is generated from the assist command section 22.

In response to the output of the phase correcting section 51, the auxiliary assist signal generating section 52 produces an auxiliary assist signal shown in FIG. 4.

On the other hand, return command section 24 produces the return torque signal. The return torque signal increases with an increase of the steering angle. These signals are added to produce a total assist signal. The polarity and absolute value of the total assist signal is detected and a duty ratio is decided in accordance with the absolute value by the drive control section 25, so that the output torque of motor 7 is controlled to reduce the steering effort. Since the assist signal increases with the increase of the torsion torque, the steering effort is properly reduced in accordance with the torsion torque. When the steering angle is held at an angle, the motor 7 is controlled by the sum of the assist signal and auxiliary assist signal and return torque signal. If the steering wheel is released from the driver's hands, the torsion torque greatly decreases, so that the summation of signals has a negative value. As a result, the motor 7 produces an output torque in the steering angle decreasing direction. Thus, the steering wheel can be easily returned to a straight ahead position with the aid of the caster effect.

When the absolute value of the output signal from the torsion torque sensor 12 in the increasing direction, the auxiliary assist signal A having a characteristic for correcting the assist signal is added to the assist signal from the assist command section 22. Thus, a proper assist torque is applied to the steering system to reduce the steering effort.

To the contrary, when the absolute value of the output signal from the torsion torque sensor 12 is in the decreasing direction, an auxiliary assist signal B having a smaller value than the signal A is added to the assist signal. Thus, the assist torque is reduced, thereby preventing the steering wheel from being rotated at higher speed than the driver estimates.

Although the torsion torque variation detecting circuit 52a is provided in the auxiliary assist signal generating section 52, the detecting circuit may be provided in the phase correcting section 51.

While the presently preferred embodiment of the present invention has been shown and described, it is to be understood that this disclosure is for the purpose of illustration and the various changes and modifications may be made without departing from scope of the invention as set forth in the appended claims.

What is claimed is:

1. In an electric power steering system having a motor operatively connected to a steering system for reducing steering effort, a torsion torque sensor provided for detecting torsion torque generating in the steering system in steering operation; first means responsive to an output signal of the torsion torque sensor for producing an assist signal, second means for producing an auxiliary assist signal dependent on a differential of the output signal of the torsion torque sensor, third means responsive to a total assist signal of the assist signal and the auxiliary assist signal for producing a signal for driving the motor; the improvement comprising:

detector means for detecting whether variation value of the output signal of the torsion torque sensor is in an increasing direction or in a decreasing direction and for producing a direction signal dependent on the detected direction; and said second means includes corrector means responsive to the direction signal representing the variation value of the output signal of the torsion torque sensor in the decreasing direction for providing a reduced value of the auxiliary assist signal, thereby reducing the total assist signal.

2. The system according to claim 1, wherein said detector means is provided for detecting said variation value by detecting variation of the absolute value of the output signal of the torsion torque sensor.

3. The system according to claim 1, wherein said second means further includes a phase correcting section which produces an output proportional to the differential of the output signal of the torsion torque sensor and an auxiliary assist generating section for producing said auxiliary assist signal dependent on said output.

4. The system according to claim 3, wherein said first means is responsive to the sum of said output of the phase correcting section and said output signal to produce said assist signal.

5. The system according to claim 3, wherein said detector means is provided in said auxiliary assist generating section.

6. The system according to claim 1, wherein
said corrector means provides said auxiliary assist signal with a smaller value in magnitude when the direction signal represents the variation value of the output signal of the torsion torque sensor in the decreasing direction compared to when the direction signal represents the variation value in the increasing direction.

7. In an electric power steering system having a motor operatively connected to a steering system for reducing steering effort, a torsion torque sensor provided for detecting torsion torque generating in the steering system in a steering operation; first means responsive to an output signal of the torsion torque sensor for producing an assist signal, second means for producing an auxiliary assist signal dependent on a differential of the output signal of the torsion torque sensor, third means responsive to a total assist signal including the assist signal and the auxiliary assist signal for producing a signal for driving the motor; the improvement comprising:
  detector means for detecting whether variation of an absolute value of the output signal of the torsion torque sensor is in an increasing direction or in a decreasing direction and for producing an increasing or a decreasing direction signal dependent on the detected direction; and
  said second means includes corrector means responsive to the direction signal representing the detected direction for correcting the auxiliary assist signal in value, thereby correcting the total assist signal.

8. The system according to claim 7, wherein
said detector means provides the increasing direction signal upon said variation of said absolute value of the output signal of the torsion torque sensor when said absolute value is in the increasing direction.

9. The system according to claim 7, wherein
said detector means provides the decreasing direction signal upon said variation of said absolute value of the output signal of the torsion torque sensor when said absolute value is in the decreasing direction.

10. The system according to claim 7, wherein
said second means further includes a phase correcting section which produces an output proportional to the differential of the output signal of the torsion torque sensor and an auxiliary assist generating section for producing said auxiliary assist signal dependent on said output.

11. The system according to claim 10, wherein
said first means is responsive to the sum of said output of the phase correcting section and said output signal to produce said assist signal.

12. The system according to claim 10, wherein
said detector means is provided in said auxiliary assist generating section.

13. The system according to claim 7, wherein
said corrector means provides said auxiliary assist signal with a smaller value in magnitude in response to the decreasing direction signal than in response to the increasing direction signal.

* * * * *